(12) United States Patent
Fitzgerald (10) Patent No.: US 6,243,393 B1
(45) Date of Patent: Jun. 5, 2001

(54) COLLISION TOLERANT RADIO MODEM

(75) Inventor: Shane Michael Fitzgerald, Long Beach, CA (US)

(73) Assignee: Electrocom Communication Systems, Santa Fe Springs, CA (US)

( * ) Notice: Subject to any disclaimer, the term of this patent is extended or adjusted under 35 U.S.C. 154(b) by 0 days.

(21) Appl. No.: 09/280,415

(22) Filed: Mar. 29, 1999

(51) Int. Cl.$^7$ .................... H04Q 7/00; H04J 3/16; H04B 1/16
(52) U.S. Cl. .................... 370/465; 370/332; 370/340; 455/214; 455/337
(58) Field of Search .................... 375/222, 257, 375/340, 342, 345, 349, 365; 370/350, 333, 332, 512, 447, 465; 455/337, 214

(56) References Cited

U.S. PATENT DOCUMENTS

| 5,337,310 | * | 8/1994 | Selyutin | 370/447 |
| 5,699,405 | * | 12/1997 | Suzuki | 375/222 |
| 5,770,927 | * | 6/1998 | Abe | 375/340 |
| 5,966,385 | * | 10/1999 | Fujii et al. | 370/465 |

* cited by examiner

Primary Examiner—Wellington Chin
Assistant Examiner—Brenda Pham
(74) Attorney, Agent, or Firm—Edward I. Jorgenson; Philip G. Meyers; Intellectual Property Law, P.C.

(57) ABSTRACT

An apparatus and system for decoding colliding data transmissions utilizing an at will transmission protocol is disclosed. An apparatus for decoding an analog signal includes an input terminal, a data bus, a first decoder connected to the input terminal and data bus, configured to receive an analog signal, decode the signal into a first message and output the message to the data bus, a second decoder connected to the input terminal and data bus and configured to receive an analog signal, determine whether the analog signal includes a second message, decode the signal into a second message and out put the message to the data bus. A microprocessor operatively connected to the first and second decoders directs the second decoder to search for a colliding second transmission immediately after the first decoder has begun to decode a first transmission. If colliding second signal captures the receiver as the first transmission is decoded, the second decoder decodes and outputs the second message intact. A method for saving one of two colliding signals includes the steps of: (1) using a receiver to receive signals transmitted by a plurality of transmission units; (2) using a first decoder to decode a first signal; (3) directing a second decoder to search for a second transmission as the first signal is decoded by the first decoder; and (4) decoding the second received signal with the second decoder.

25 Claims, 7 Drawing Sheets

COLLISION TOLERANT RADIO MODEM

TECHNICAL FIELD OF THE INVENTION

The invention relates to data transmissions and, in particular, to mobile data transmission systems using ALOHA as the multiple access protocol.

BACKGROUND OF THE INVENTION

A multiple access protocol is a communications protocol which allows multiple users access to a single channel (normally one at a time). In the case of a mobile data transmission system, the mobile system may have one radio channel which can be used by multiple mobile data terminals, one terminal at a time. Access control is determined by the particular multiple access protocol utilized. A number of different multiple access protocols may be utilized including Carrier Sense Multiple Access ("CSMA"), Time Division Multiple Access ("TDMA"), Code Division Multiple Access ("CDMA"), and ALOHA.

In a CSMA (Carrier Sense Multiple Access) protocol system, the mobile transmission device must check the status of the channel prior to transmitting. If the device senses carrier activity, it must wait until the channel is clear before transmitting.

In a TDMA (Time Division Multiple Access) protocol system, a single channel is divided into multiple time slots. Users are assigned time slots during which transmissions are allowed which segregate the users in time, thereby preventing overlap.

Users of a CDMA (Code Division Multiple Access) protocol system are assigned unique identification numbers which are multiplied by the user's transmission data. At the receiving end, the received signals are divided by the user's unique identification number in order to separate the individual transmissions.

In an ALOHA protocol system, users are permitted to transmit at will, regardless of whether the channel is busy or not. *Newton's Telecom Dictionary* (12th ed. 1997). Multiple simultaneous transmissions that result in colliding data streams can cause the transmissions to be nonrecoverable. When two messages collide and both are unrecoverable, both messages must be retransmitted, along with any new messages which have since queued. This situation can rapidly escalate to an avalanche condition which prematurely saturates an ALOHA-BASED data transmission system.

Mobile data transmissions typically start with a synchronization preamble which allows the modem to recognize the start of a data transmission. Most of these synchronization preambles consist of a known sequence of bits (i.e., 1100110011001100 . . . for some period of time) followed by the message itself, which is random in nature (i.e., 10011101000101 . . . ).

Capture effect is a phenomenon associated with the reception of frequency-modulated signals in which, if two signals are on or near the same frequency, only the stronger of the two will appear at the output. Complete suppression of the weaker signal occurs at the receiver limiter, where the weaker signal is treated as noise and rejected. Thus, FM capture is a phenomenon in which one radio frequency ("RF") signal, if it is of sufficient amplitude relative to a simultaneously received weaker signal, will overpower the weaker signal and be received as if the weaker interfering signal were not present.

Thus, when a second-in-time transmission collides with a first-in-time transmission that is being decoded, if the second signal has sufficient amplitude to capture the receiver, the second signal will be decoded as if it were part of the first signal, resulting in an output which is an uncorrectable combination of the first and second transmissions. In this case, both transmissions must be retransmitted. Thus, there exists a need for an apparatus and method for reducing the need for retransmitting colliding signals.

SUMMARY OF THE INVENTION

In one embodiment, the present invention provides an apparatus for decoding an analog signal including an input terminal, a data bus, a first decoder and a second decoder. The first decoder is connected to the input terminal and data bus and configured to receive an analog signal, decode the signal into a first message and output the message to the data bus. The second decoder is also connected to the input terminal and data bus and configured to receive an analog signal, determine whether the analog signal includes a second message, decode the signal into a second message and out put the message to the data bus. In particular, the invention provides an apparatus and data transmission system for receiving and decoding data transmissions where an at will transmission protocol such as ALOHA is utilized.

A plurality of transmission units, and in particular mobile transmission units, transmit analog signals on a selected frequency on an at will basis. The signals are received by a receiver which is connected to a decoder for decoding and outputting the contents of the transmission. A second decoder is provided for detecting and decoding a colliding second signal having an amplitude sufficient to capture the receiver. A microprocessor operatively connected to the first and second decoders directs the second decoder to search for a colliding second transmission immediately after the first decoder has begun to decode a first transmission. Thus, in the event that a colliding second signal captures the receiver as the first transmission is decoded, the second decoder decodes and outputs the second message intact, even though the output from the first decoder will be an uncorrectable concatenated combination of the first and second transmissions. In one variation, a step change in the Received Signal Strength Indicator ("RSSI") is used to trigger the command for the second decoder to search for a synchronization preamble of a second transmission.

The invention also provides a method for saving one of two colliding signals in a transmission system utilizing an at will transmission protocol such as ALOHA where the second signal is of sufficient amplitude or strength capture to capture the receiver as a first transmission is being decoded. The method includes the steps of: (1) using a receiver to receive signals transmitted by a plurality of transmission units; (2) using a first decoder to decode a first signal; (3) directing a second decoder to search for a second transmission as the first signal is decoded by the first decoder; and (4) decoding the second received signal, assuming that the second received signal has sufficient amplitude to capture the receiver. The second decoder may be directed to search for the synchronization preamble of a second colliding transmission immediately after the first decoder begins decoding the first signal. Alternatively, the second decoder may be prompted to search for the synchronization preamble of a second signal if a step change in the received signal strength indicator is detected. The method of the invention may also include the step of utilizing a microprocessor to prompt or direct the second decoder to search for a second signal as a first signal is being decoded.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION

In a mobile data transmission system utilizing ALOHA as the multiple access protocol, when two transmissions collide, i.e., overlap in time, one or both of the colliding transmissions may be rendered nonrecoverable. If the amplitude of the RF signal of both transmissions is similar, i.e., within the FM capture window, both messages may be lost. If the second-in-time signal is of sufficient amplitude to capture the receiver as a first-in-time message is being decoded, the result will be a uncorrectable concatenated combination of the first and second signals. Referring now to the drawings, wherein like numerals in the different figures refer to corresponding parts and steps, the collision tolerant modem of the invention and a method of use of the modem are illustrated.

Figure 1:
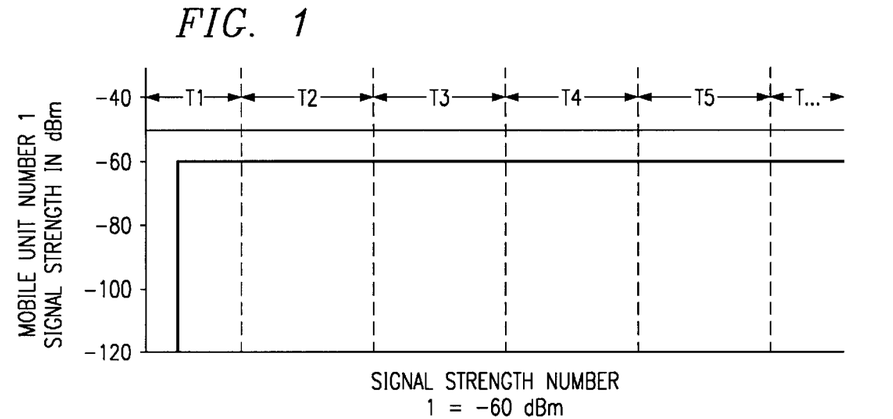
FIGS. 1 and 2 are graphical representations of colliding signals of equal amplitude.
Figure 2:
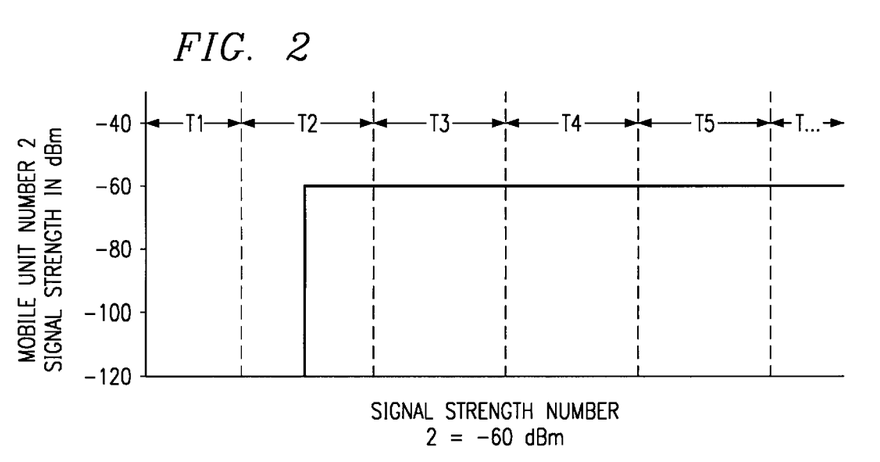

Referring now to FIGS. 1 and 2, a first type of frequency collision is graphically illustrated. During the time period designated T1, a first mobile unit ("mobile unit one") begins a first transmission that is received with a signal strength of −60 dBm. The modem recognizes the synchronization preamble and starts decoding the message. While the first signal is being decoded, during time period T2, a second mobile unit ("mobile unit two") begins a transmission that is also received with a signal strength of −60 dBm. Since neither signal possesses a relative signal strength equal to nor greater than that required to capture the receiver, neither signal is received. The two transmissions are thoroughly garbled; both transmissions must be retransmitted.

Figure 3:
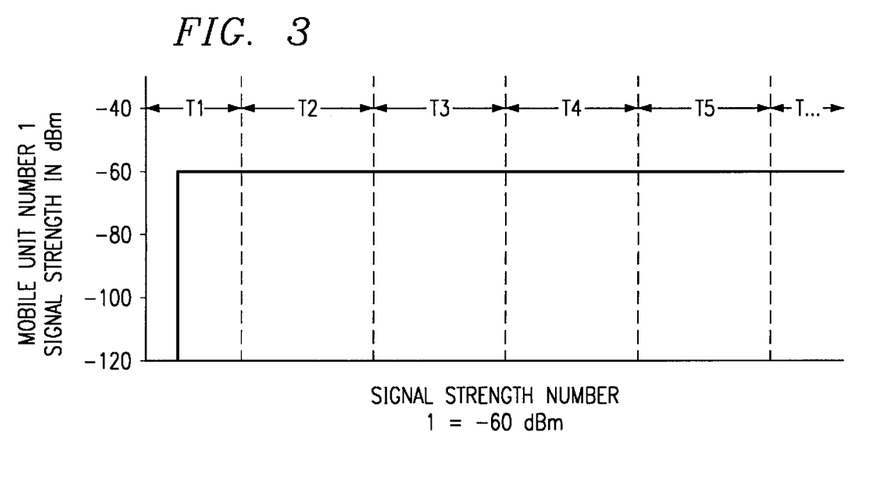
FIGS. 3 and 4 are graphical representations of colliding signals of different amplitudes wherein the signal strength of the second signal is not sufficient to capture the receiver.

If the amplitude of the two signals differs by an amount equal to, or greater than, the level required for FM capture, one of the signals may be recoverable. This type of frequency collision is graphically illustrated in FIGS. 3 and 4. As illustrated in FIG. 3, mobile unit one begins a transmission during time period T1 that is received with a signal strength of −60 dBm. The modem recognizes the synchronization preamble and begins decoding the data message.

Figure 4:
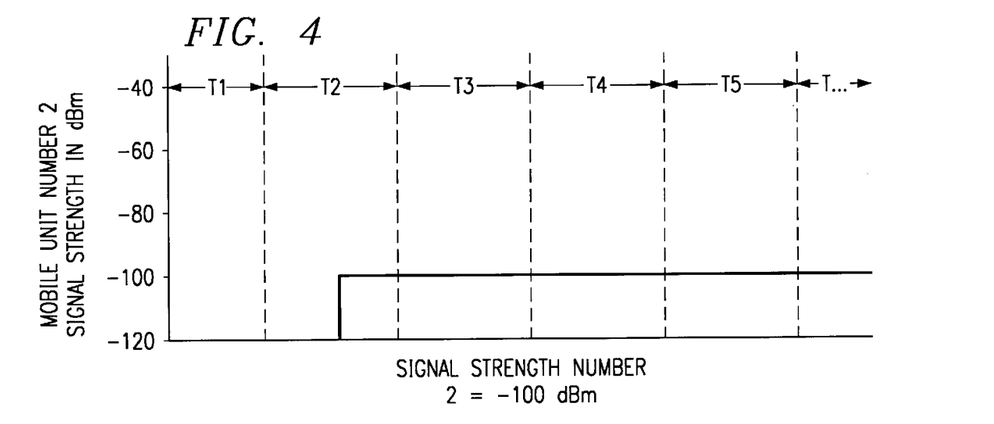

As shown in FIG. 4, during time period T2, while mobile unit one is still transmitting, mobile unit two begins a transmission that is received with a signal strength of −100 dBm. Since mobile unit one is transmitting an RF signal of sufficient amplitude to capture the receiver, mobile unit two is simply not heard and does not interfere with the proper decoding of mobile unit one's transmission. In this type of transmission collision, FM capture allows one of the colliding messages to be recovered; thus, only one message needs to be retransmitted.

Figure 5:
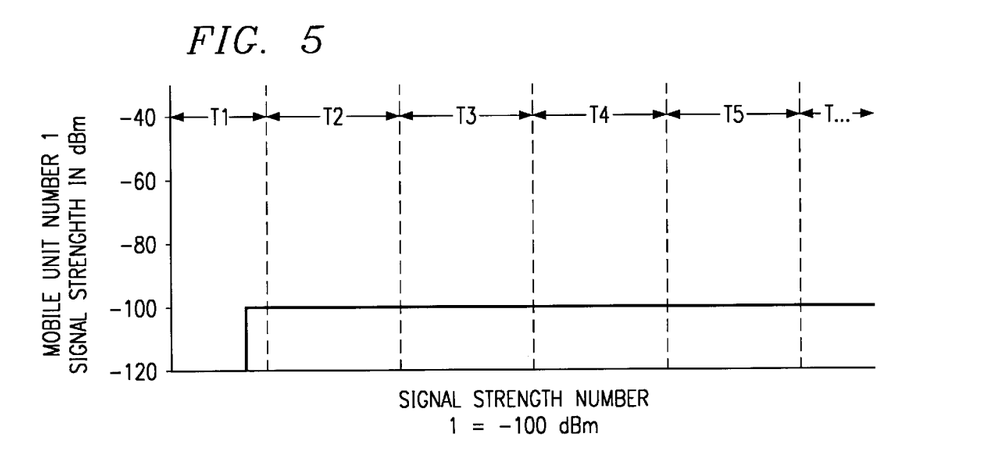
FIGS. 5 and 6 are graphical representations of colliding signals of different amplitudes wherein the signal strength of the second signal is sufficient to capture the receiver.
Figure 6:
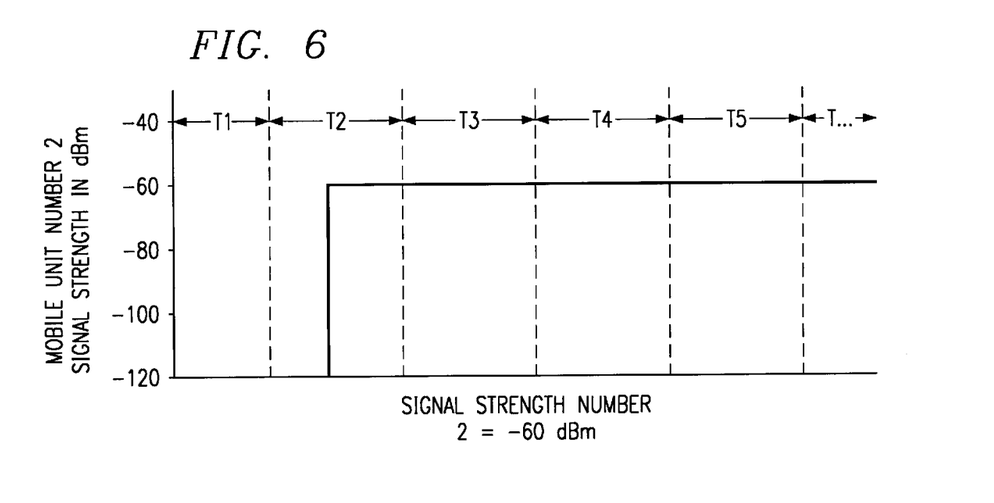

A third type of transmission collision, in which the second transmission is transmitted and received with sufficient amplitude to capture the receiver, is graphically illustrated in FIGS. 5 and 6. As shown in FIG. 5, mobile unit one begins a transmission during time period T1 and is received with a signal strength of −100 dBm. The modem recognizes the synchronization preamble and begins decoding the data message.

As illustrated in FIG. 6, during time period T2, mobile unit two begins a transmission that is received with a signal strength of −60 dBm. The RF signal transmitted by mobile unit two is of sufficient amplitude to capture the receiver. Consequently, the modem begins incorrectly decoding mobile unit two's transmission, including the synchronization preamble, as if it were part of mobile unit one's transmission. Therefore, when the transmissions are complete, the modem has decoded a concatenated message consisting of a first part of mobile unit one's transmission, with the remainder of the message comprising the transmission from mobile unit two. This concatenated message will not pass error detection checking and is not correctable. Therefore, both transmissions must be retransmitted.

Figure 7:
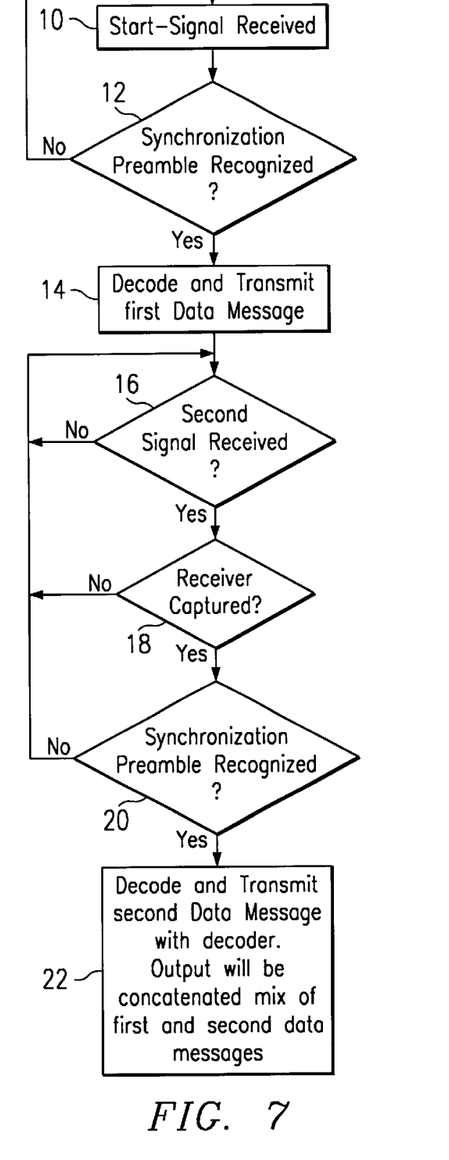
FIG. 7 is a flowchart illustrating reception of the colliding signals graphically represented in FIGS. 5 and 6 when received by a conventional modem.

FIG. 7 is a flowchart illustrating the steps occurring in the foregoing transmission collision when a conventional modem receives the colliding transmissions. A first signal having an amplitude of −100 dBm is received during T1 (FIG. 6) at step 10. The modem checks to determine whether the synchronization preamble is recognized at step 12. Assuming the synchronization preamble is recognized, the modem begins decoding and transmitting the data message at step 14.

At step 16, a second signal is received during, for example, the time period corresponding to T2 of FIG. 6. The second signal could, of course, be received during any time period subsequent to receipt of the first signal. If the amplitude of the second signal is high enough to capture the receiver (step 18), and the synchronization preamble is recognized (step 20), the modem will begin decoding the second signal as if it were part of the first transmission. Thus, as noted above, the modem will decode a concatenated message (step 22) consisting of the first part of the first transmission and a second part corresponding to all or a portion of the second transmission. The concatenated message will not pass error detection, is not correctable and, consequently, both messages will have to be retransmitted. The apparatus and method of the invention are directed to this type of transmission collision and are designed to save the second message, in which case only the first message will require retransmission.

Figure 10:
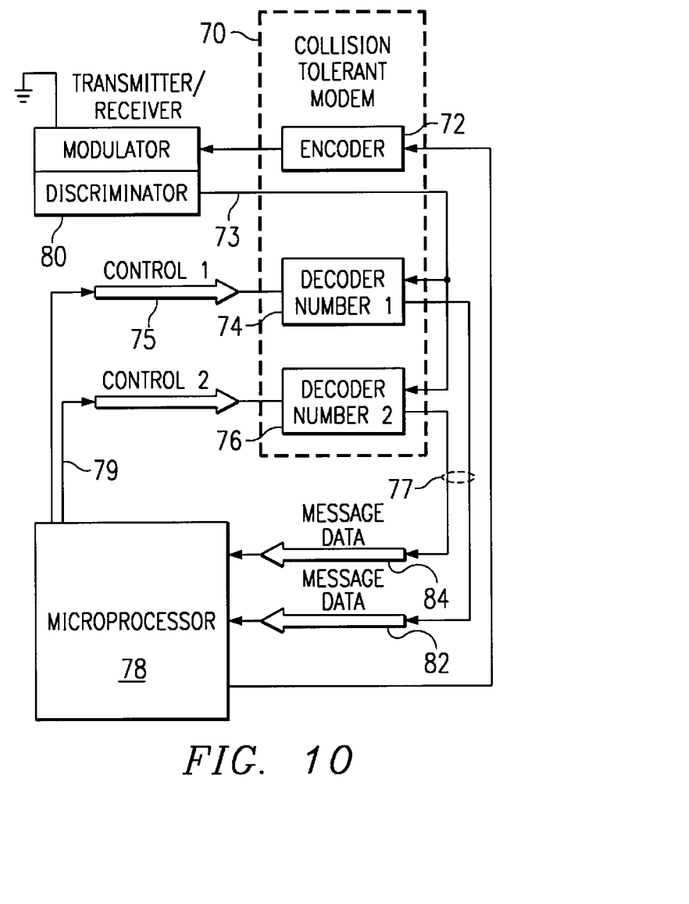
FIG. 10 is a block diagram illustrating the configuration of a collision tolerant modem of the invention.

Referring now to FIG. 10, a block diagram schematically representing the collision tolerant modem 70 of the invention along with a transmitter/receiver 80 and microprocessor 78. As shown, the collision tolerant modem 70 includes an encoder (or modulator) 72 and a decoder (or demodulator) 74 similar to a normal modem. A transmitter/receiver 80 receives analog signals to be decoded by the modem 70. The modem of the invention includes a second decoder (demodulator) 76. The second decoder module 76 provides for the collision tolerant feature of modem 70. The first and second decoders 74, 76 are connected to the receiver via input terminal 73 and output decoded messages via data bus 77. The operation of first decoder 74 and second decoder 76 are controlled with a microprocessor 78, as generally indicated by arrows 75 and 79, programmed to implement the collision tolerant feature of the modem.

The operation of the collision tolerant modem 70 will be explained with reference to FIG. 8, a flow diagram depicting the method of operation of the modem, and, in connection with FIGS. 6 and 7, graphical representations of colliding transmissions wherein the second transmission is of sufficient amplitude to capture the receiver.

Figure 8:
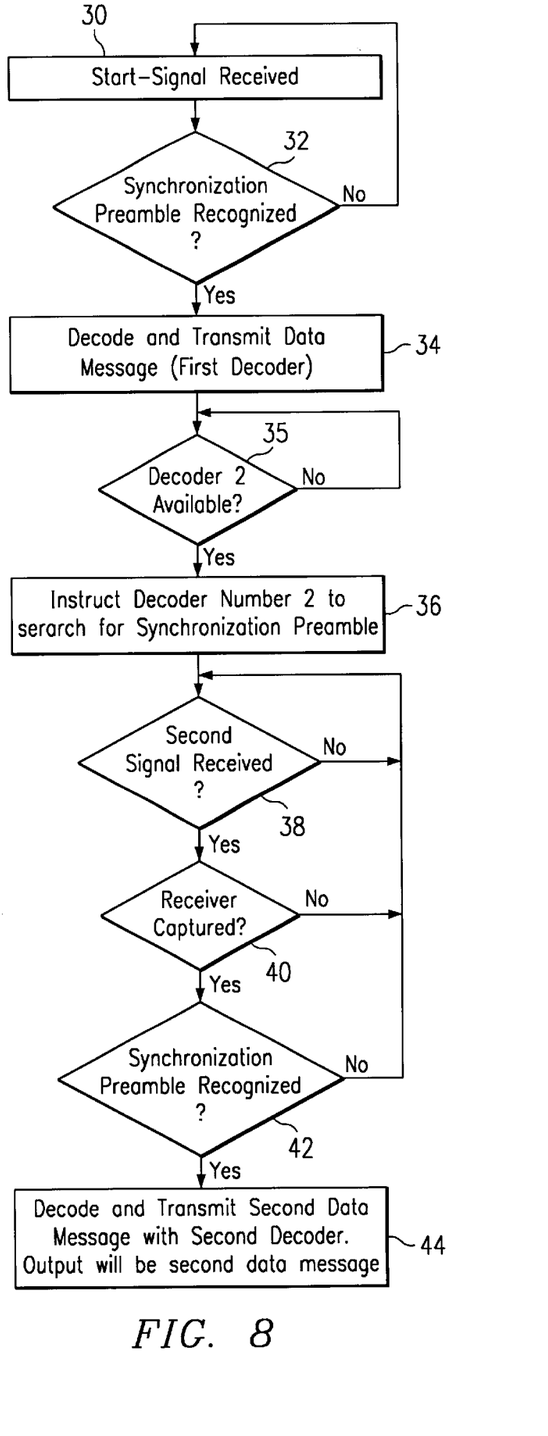
FIG. 8 is a flowchart illustrating reception of the colliding signals graphically represented in FIGS. 5 and 6 in which the signals are received in accordance with a first method utilizing a collision tolerant modem of the invention.

Referring now to FIG. 8, at step 30 a first signal, with an amplitude of –100 dBm originating from a first mobile unit is detected. The modem checks to determine whether the synchronization preamble is recognized at step 32. Assuming the synchronization preamble is recognized, first decoder 74 begins decoding and transmitting the data message (step 34) as generally indicated by arrow 82 of FIG. 10.

As soon a first decoder 74 begins decoding the first signal, the availability of a second decoder 76 is checked (step 35). Assuming a second decoder 76 is available, it is instructed to begin searching for a synchronization preamble (step 36). At this point in time the synchronization preamble for the first message has been decoded During time period T2, or at a time subsequent to receipt of the first transmission, mobile unit two begins transmission of a second signal that is received with a signal level of –60 dBm (step 38). The relative amplitude of the signal transmitted by mobile unit two is sufficient to capture the receiver (step 40). If the synchronization code is recognized at step 32, first decoder 74 incorrectly starts to decode mobile unit two's transmission, including the synchronization preamble, as mobile unit one's data message. However, decoder 76 simultaneously recognizes the synchronization preamble (step 42) and begins to decode the transmission originating from mobile unit two, (step 44). Thus, mobile unit two's data message will be correctly decoded by decoder 76 and transmitted as indicated by arrow 84 of FIG. 10.

Figure 9:
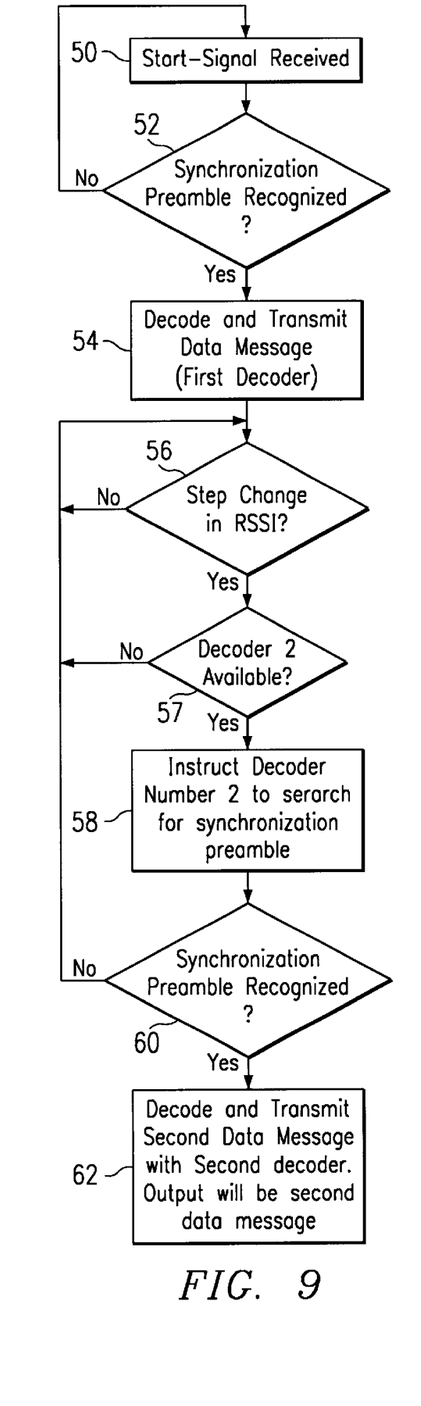
FIG. 9 is a flowchart illustrating reception of the colliding signals graphically represented in FIGS. 5 and 6 in which the signals are received in accordance with a second method utilizing a collision tolerant modem of the invention.

Referring now to FIG. 9, a second method of implementing the collision tolerant feature of the invention is illustrated via a flowchart. A first signal with an amplitude of –100 dBm originating from a first mobile unit is received at step 50 by receiver 80. The modem 70 checks to determine whether the synchronization preamble is recognized at step 52, and if the synchronization preamble is recognized, first decoder 74 begins decoding and transmitting the data message (step 54) as generally indicated by arrow 82 of FIG. 10.

At step 56 the strength of the signal is checked to determine whether there has been a step change registered by the Received Signal Strength Indicator ("RSSI"). If, for example, during time period T2, or at a time subsequent to receipt of the first transmission, mobile unit two begins transmission of a second signal with a signal strength that causes a step change in the RSSI, the availability of a second decoder is determined (step 57). Assuming that a second decoder is available, it is directed or prompted to search for a synchronization preamble or code (step 58). If the receiver is captured by the second transmission, first decoder 74 begins to decode mobile unit two's transmission, including the synchronization preamble, as mobile unit one's data message. However, decoder 76 simultaneously recognizes the synchronization preamble associated with mobile unit two's transmission (step 60) and begins to decode the transmission originating from mobile unit two (step 62). Thus, mobile unit two's data message will be correctly decoded by decoder 76 and transmitted as generally indicated by arrow 84 of FIG. 10.

The collision tolerant modem ensures that if the capture criterion is met, one of the two colliding messages will be correctly received, thereby reducing retransmissions by a factor of two. Thus the collision tolerant modem and method of the invention alleviate approximately one-half of the need for re-transmission for signal collisions in which the second signal captures the receiver; thereby providing greater throughput and increased capacity for ALOHA based mobile data systems.

Figure 11:
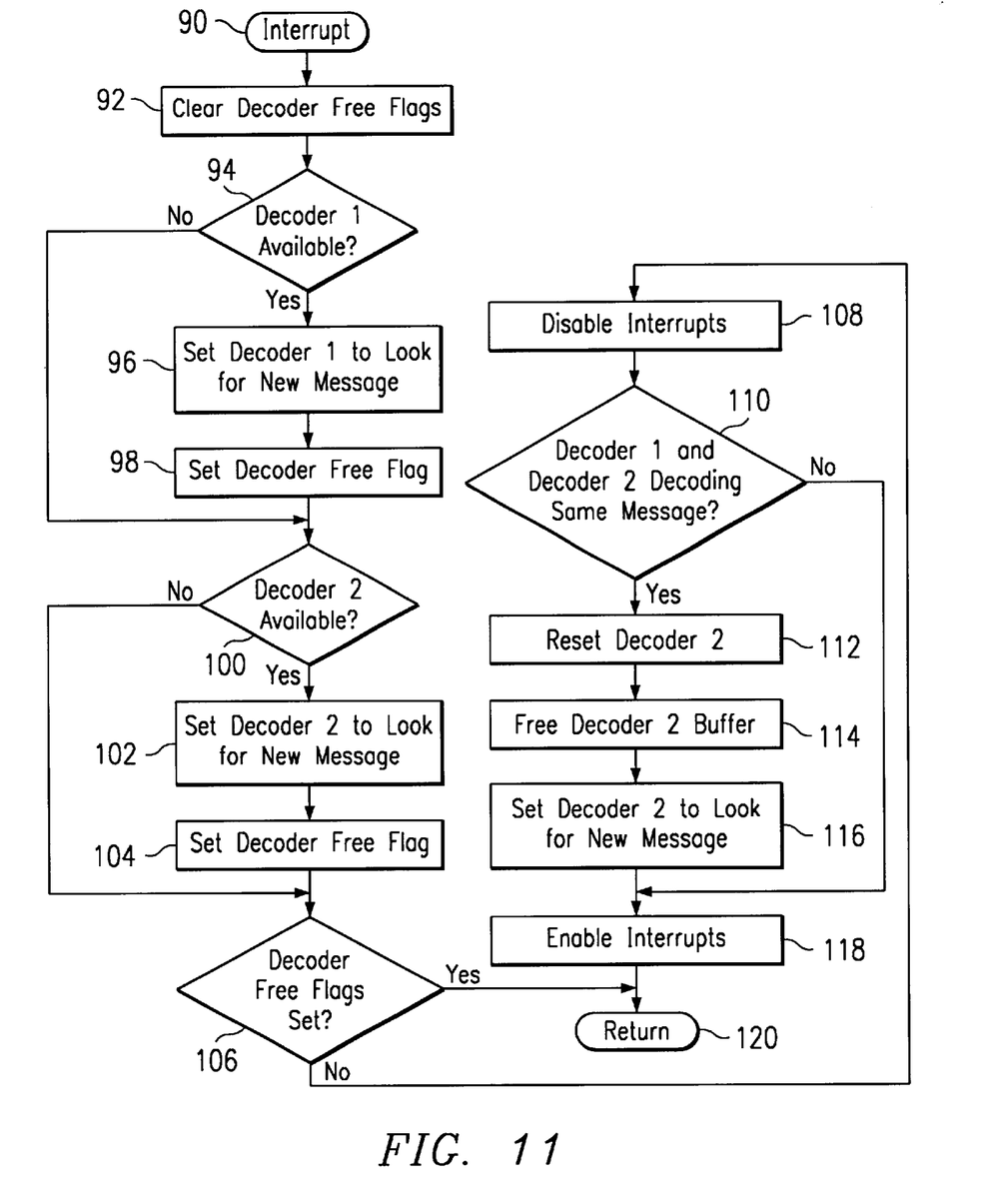
FIG. 11 is a flowchart illustrating a control scheme for use in connection with the collision tolerant modem of the invention.

Referring now to FIG. 11, a flowchart representing a control scheme for the collision resistant modem of the present invention is illustrated. Interrupt 90 may be initiated on a pretimed basis and in response to a step change in RSSI or upon receipt of a second signal while a first signal is being received and decoded. At step 92, an indicator or flag associated with each decoder is cleared. The availability of a first decoder is checked (step 96) and assuming that the first decoder is available, the decoder is set to look for a new message (step 96) and the associated decoder free flag is set (step 98). Assuming that the first decoder is unavailable or after the first decoder free flag is set, the availability of a second decoder is checked at step 100. Assuming that the second decoder is available, the decoder is set to look for a new message (step 102) and the associated decoder free flag is set (step 104).

The status of the decoder free flags is check at step 106. Assuming that the flags are not set, the program interrupts are disabled at step 108, to avoid an interrupt while a determination is made at step 110 as to whether both decoders are decoding the same message. If the decoders are decoding the same message, i.e. a message received by both decoders at the same time or within a very short interval, for example 5 milliseconds, the second decoder is reset at step 112 to free it to decode a second message. The buffer associated with the second decoder is cleared at step 114 and the second decoder is set to look for a new message at step 116. The interrupts are enabled at step 118 and control is returned to step 90 (step 120). As noted above, the interrupt 90 may be initiated by a step change in RSSI or if a second-received signal captures the receiver in which case the second decoder is set to receive and decode the second message.

Figure 12A:
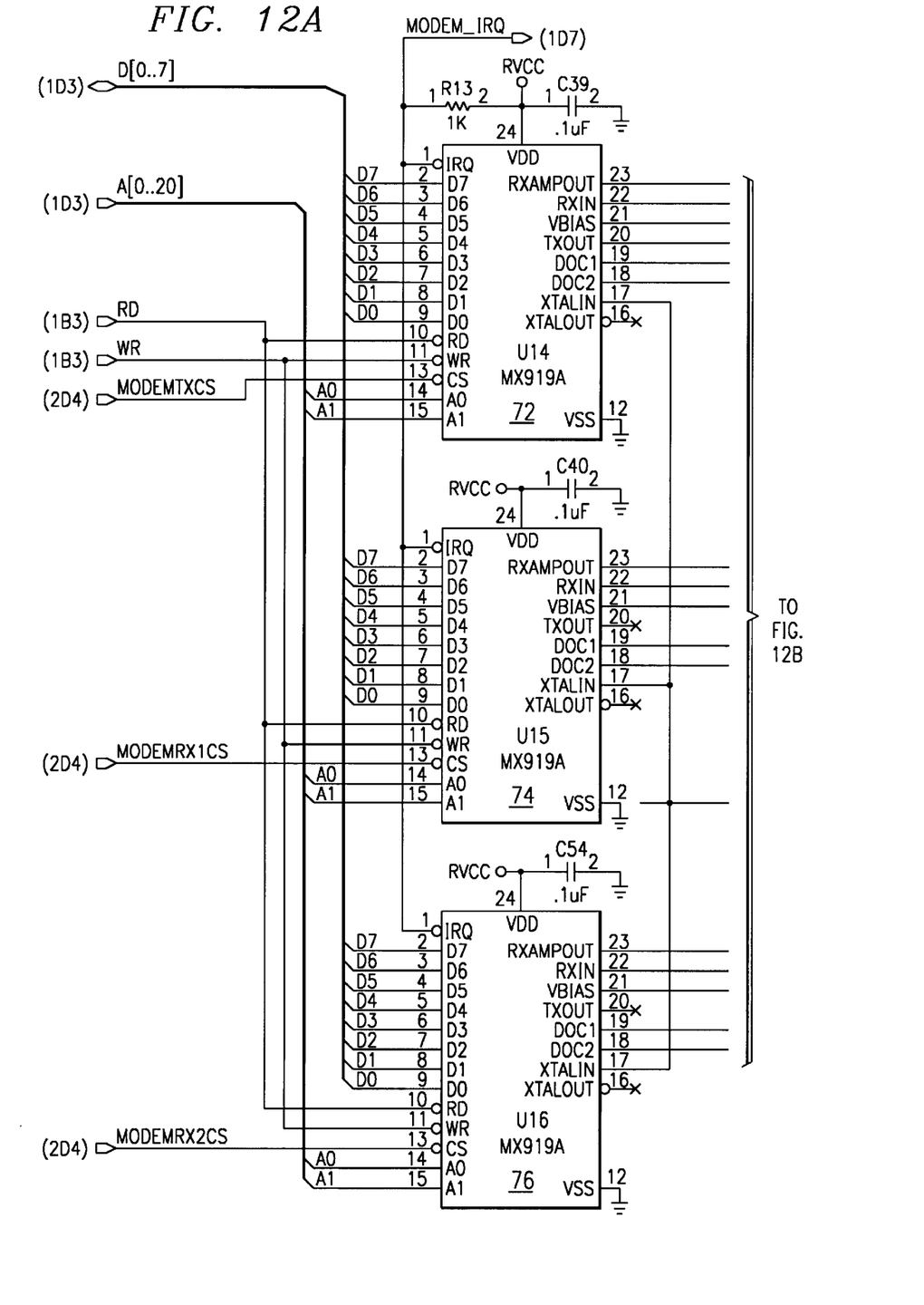
FIG. 12 is a schematic illustrating the configuration of a multiple decoder apparatus suitable for use in the practice of the invention.
Figure 12B:
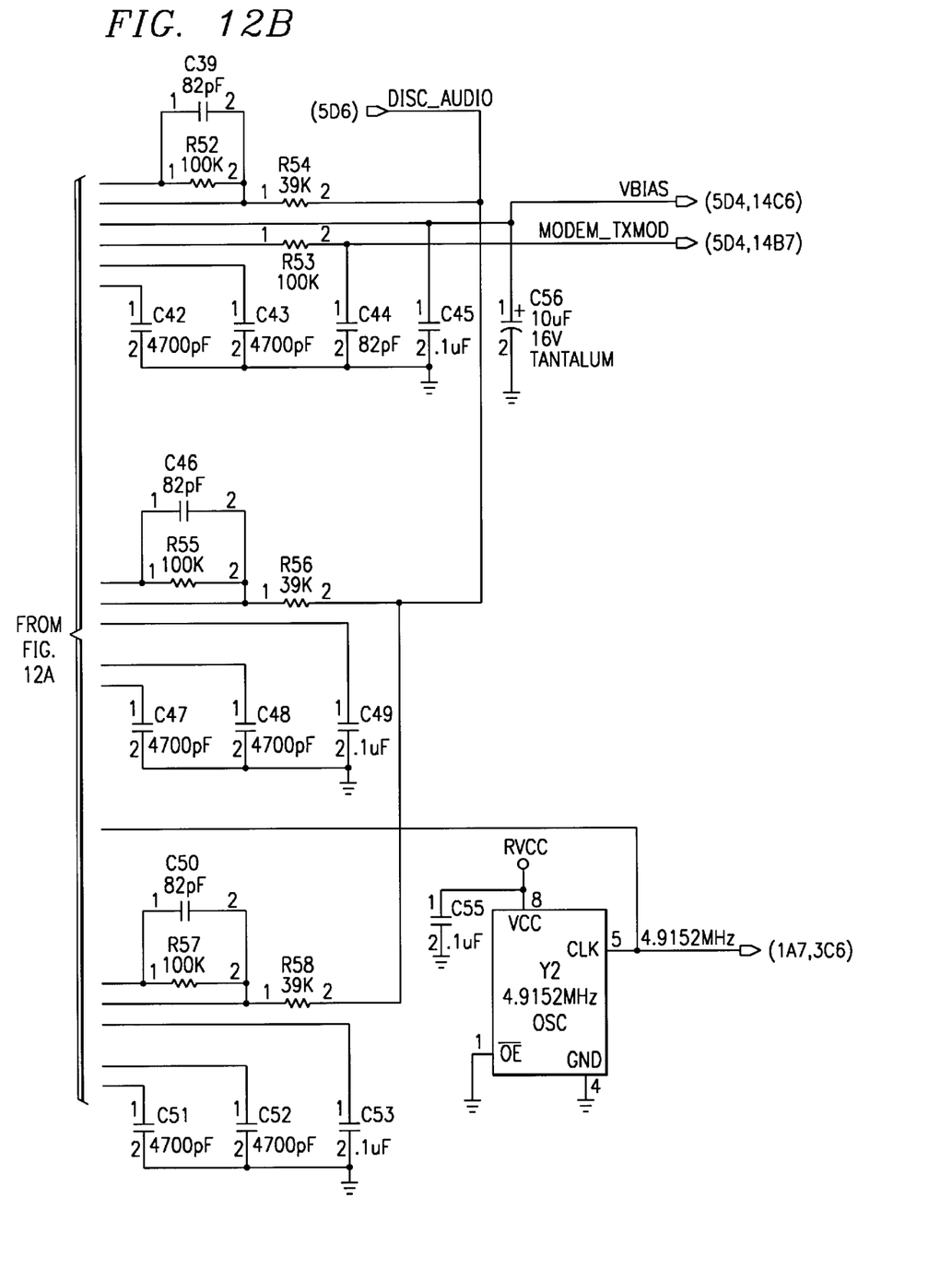

Referring now to FIG. 12 a schematic illustrating the configuration of a multiple decoder apparatus suitable for use in the practice of the invention is presented. As illustrated, encoder 72 and decoders 74 and 76 are mixed signal integrated circuits manufactured and sold by MX COM, under the designation MX919B.

Although various embodiments of the invention have been illustrated in the accompanying Drawings and described in the foregoing Detailed Description, it will be understood that the invention is not limited to the embodiments disclosed. For example, while the invention has been described in the context of mobile transmission units, the invention is equally applicable to stationary transmission sources. Further, while the invention has been described in the context of a single modem utilizing two decoders, the invention may be applicable to systems incorporating multiple modems, each having a plurality of decoders. Thus, as will be appreciated by those skilled in the art, the invention is susceptible to numerous modifications and variations without departing from the spirit and scope of the invention as hereinafter claimed.

What is claimed:

1. An apparatus for receiving analog signals on a preselected frequency comprising:
   an input terminal:
   a data bus;
   a first decoder connected to the input terminal and data bus, the first decoder configured to receive a first analog signal, decode the analog signal into a first message and output the first message to the data bus;
   a second decoder connected to the input terminal and data bus, the second decoder configured to receive an analog signal, determine whether the analog signal contains a second message and decode and output the second message to the data bus;
   a microprocessor operatively connected to the second decoder, the microprocessor including instructions to direct the second decoder to search for a second transmission as the first signal is decoded by the first decoder; and
   wherein the second decoder is directed to search for the synchronization preamble of a second signal as the first signal is received.

2. The apparatus of claim 1 wherein the second decoder is directed to search for a second transmission after a step change in the received signal strength indicator.

3. The apparatus of claim 2 wherein the second decoder is prompted, upon a step change in the received signal strength indicator, to search for the synchronization preamble of a second transmission as a first transmission is received.

4. The apparatus of claim 1 wherein the second decoder decodes and S outputs the second transmission.

5. The apparatus of claim 1 wherein signals are received from a plurality of mobile transmission units.

6. The apparatus of claim 1 wherein the apparatus is adapted to operate utilizing the ALOHA transmission protocol.

7. An apparatus for receiving colliding signals transmitted on a selected frequency comprising:
   a receiver for receiving signals on a selected frequency;
   a first decoder for decoding a first received signal;
   a second decoder for decoding a second received signal of sufficient amplitude to capture the receiver, the second signal colliding with the first signal; and
   a microprocessor, operatively connected to the second decoder, the microprocessor including instructions to direct the second decoder to search for a second transmission as the first signal is decoded by the first decoder.

8. The apparatus of claim 7 wherein the second decoder is directed to search for the synchronization preamble of a second signal as the first signal is received.

9. The apparatus of claim 7 wherein the second decoder is directed to search for a second transmission after a step change in the received signal strength indicator.

10. The apparatus of claim 9 wherein the second decoder is prompted, upon a step change in the received signal strength indicator, to search for the synchronization preamble of a second transmission as a first transmission is received.

11. The apparatus of claim 7 wherein the second decoder decodes and outputs the second transmission.

12. The apparatus of claim 7 wherein signals are received from a plurality of mobile transmission units.

13. The apparatus of claim 1 wherein the apparatus is adapted to operate utilizing the ALOHA transmission protocol.

14. A method of decoding colliding signals received by a modem in a data transmission system utilizing a transmit at will communications protocol comprising the steps of:
   utilizing a receiver to receive signals transmitted by a plurality of transmission units;
   utilizing a first decoder to decode a first signal;
   directing a second decoder to search for a second colliding transmission as the first signal is decoded by the first decoder; and
   decoding a second received signal, the second received signal having sufficient amplitude to capture the receiver.

15. The method of claim 14 wherein the second decoder is directed to search for the synchronization preamble of a second signal as the first signal is received.

16. The method of claim 14 wherein the second decoder is directed, upon a step change in the received signal strength indicator, to search for a second transmission.

17. The method of claim 14 further comprising the step of utilizing a microprocessor to direct the second decoder to search for a second signal.

18. The method of claim 14 further comprising the step of decoding and outputting the second transmission.

19. The method of claim 14 wherein signals are received from a plurality of mobile transmission units.

20. A data transmission system utilizing a transmit at will communications protocol comprising:
   a plurality of mobile transmission units;
   a receiver for receiving radio frequency signals transmitted by the plurality of mobile transmission units on a selected frequency;
   a first decoder for decoding a first received signal;
   a second decoder for decoding a colliding second signal; and
   a microprocessor, operatively connected to the second decoder, the microprocessor including instructions directing the second decoder to search for a second transmission as the first signal is decoded by the first decoder.

21. The data transmission system of claim 20 wherein the second decoder is directed to search for the synchronization preamble of a second signal as the first signal is received.

22. The data transmission system of claim 20 wherein the second decoder is directed, upon a step change in the received strength signal indicator, to search for a second transmission as a first transmission is received.

23. The data transmission system of claim 22 wherein the second decoder is directed to search for the synchronization preamble of a second transmission after a step change in the received signal strength indicator.

24. The data transmission system of claim 20 wherein the second decoder decodes and outputs the second transmission.

25. The data transmission system of claim 20 wherein the at will communications protocol is the ALOHA transmission protocol.

* * * * *